United States Patent [19]

Nicolaci

[11] Patent Number: 5,749,011
[45] Date of Patent: May 5, 1998

[54] CAMERA STABILIZING MECHANISM

[76] Inventor: John F. Nicolaci, 36 Indian Cove Rd., Marion, Mass. 02738

[21] Appl. No.: 762,603

[22] Filed: Dec. 9, 1996

Related U.S. Application Data

[63] Continuation of Ser. No. 345,609, Nov. 28, 1994, abandoned, which is a continuation of Ser. No. 71,198, Jun. 2, 1993, Pat. No. 5,373,334.

[51] Int. Cl.$^6$ .................................................. G03B 29/00
[52] U.S. Cl. .................................................. 396/421; 396/428
[58] Field of Search .................................... 396/419, 420, 396/421, 422, 424, 426, 429, 428; 224/185

[56] References Cited

U.S. PATENT DOCUMENTS

| | | | |
|---|---|---|---|
| D. 341,370 | 11/1993 | Hart et al. | D16/242 |
| 2,223,201 | 4/1940 | Pyzel | 354/82 |
| 2,239,201 | 4/1941 | Pyzel | 354/82 |
| 4,327,986 | 5/1982 | Carter | 354/82 |
| 4,437,753 | 3/1984 | Dunn | 354/82 |
| 4,526,308 | 7/1985 | Dovey | 354/82 |
| 4,530,580 | 7/1985 | Ueda et al. | 354/82 |
| 4,542,966 | 9/1985 | Knaudt | 354/82 |
| 4,687,309 | 8/1987 | Breslau | 354/82 |
| 4,943,820 | 7/1990 | Larock | 354/82 |
| 4,967,282 | 10/1990 | Malavasi | 354/82 |
| 5,038,160 | 8/1991 | Schumacher et al. | 354/82 |
| 5,073,788 | 12/1991 | Lingwall | 354/82 |
| 5,202,712 | 4/1993 | Fitz et al. | 354/81 |
| 5,243,370 | 9/1993 | Slater | 354/82 |
| 5,294,947 | 3/1994 | Harrington | 354/82 |
| 5,332,136 | 7/1994 | Rudolph | 224/185 |
| 5,373,334 | 12/1994 | Nicolaci | 354/82 |
| 5,462,214 | 10/1995 | Buswell | 354/82 |

*Primary Examiner*—Safet Metjahic
*Assistant Examiner*—Nicholas J. Tuccillo
*Attorney, Agent, or Firm*—Cesari and McKenna, LLP

[57] ABSTRACT

A stabilizing mechanism for a hand-held device, such as a video camera, through which a user looks, includes a stabilizing rod which is coupled to the bottom surface of the device and extends over the shoulder of the user. The rod is preferably a light-weight, telescoping rod which can be pressed into a small pocket size device. In another embodiment, the stabilizing rod is coupled to the interior of the device and extends through an opening in the rear portion of the device. In either embodiment, the rod is preferably light-weight and telescoping, so that it can be substantially reduced in length. For either embodiment, the rod preferably can be rotated by an angle which is sufficient so that the rod can be positioned over either should of the use when it is held in operating position.

2 Claims, 3 Drawing Sheets

CAMERA STABILIZING MECHANISM

This application is a continuation of patent application Ser. No. 08/345,609, filed on Nov. 28, 1994 now abandoned, which is a continuation of patent application Ser. No. 08/071,198, filed on Jun. 2, 1993 which issued as U.S. Pat. No. 5,373,334.

BACKGROUND OF THE INVENTION

This invention relates to a mechanism for stabilizing a hand-held device, such as a video camera, through which a user looks.

Hand-held video cameras are a popular way to take home movies. While these cameras are small, portable, light-weight, and convenient, the picture quality can be unsatisfactory due to tremors and jitters in the user's hand when holding the camera. These tremors and jitters can be eliminated with some current mechanisms, such as tripods. A tripod is mounted to the underside of the camera and uses the ground for stability. A tripod involves set-up effort, and extra weight and bulk for the typical consumer. Consequently, it detracts from the advantages of a hand-held camera, namely small size, portability, and quick maneuverability.

SUMMARY OF THE INVENTION

It would be desirable to have a mechanism which would reduce the jitter associated with hand-held camera, while not contributing significantly to the weight and bulk of the camera unit.

It is an object of the present invention to provide a mechanism for stabilizing a hand-held object, such as a video camera.

It another object of the present invention to provide a light-weight and easily portable mechanism for stabilizing a video camera.

It is still another object of the present invention to provide a mechanism for stabilizing an object through which a user looks at objects, such as a telescope or binoculars.

These and other objects are addressed by an apparatus for use by an individual with a hand held device having an optical system through which the individual may observe an object. The apparatus has a telescopic rod formed of a series of telescopic sections fitting axially within one another, and means for securing the outermost section to the device for movement limited to one plane.

In preferred embodiments, the apparatus also comprises a bracket which has a first portion coupled to the outermost section, and a second portion having an aperture, so that the outermost section extends through the aperture. The bracket couples the rod to the bottom of the device, and allows movement in the plane horizontal to the user. The rod extends toward the individual when the individual is observing an object.

In another aspect, the invention features a stabilizing apparatus for a hand held device which has a housing enclosing an interior portion and a rear portion which faces the user and which has an opening. The apparatus includes a rod coupled to the interior of the device and extending through the opening a sufficient distance so that it extends to the upper torso of the user when the user is looking through the device.

In preferred embodiments, the rod is a telescoping rod with a plurality of sections and is pivotally coupled for lateral movement so that it can be positioned over near either shoulder of the user. The opening is substantially wider than the diameter of the rod to allow lateral movement of the rod.

In another aspect, the invention features a method for a user to stabilize a device through which a user looks. The method includes the steps of coupling a rod to the device, and positioning the rod against the upper torso of the user when the user looks through the device. Preferably, the step of coupling a rod comprises coupling a telescoping rod to the device, the telescoping rod having a series of axially aligned sections.

The stabilizing mechanism according to the present invention reduces the transfer of tremors from the hand to the camera and thus improves the quality of the film, while adding little to the weight and bulk of the camera. The stabilizing mechanism can be provided as a separate unit which is removably coupled to the camera, or may be manufactured as an integral part of the camera.

BRIEF DESCRIPTION OF THE DRAWINGS

Other objects, features, and advantages will be apparent from the following description of the preferred embodiments and from the claims, when read in conjunction with the following drawings in which:

DESCRIPTION OF THE PREFERRED EMBODIMENTS

Figure 1:
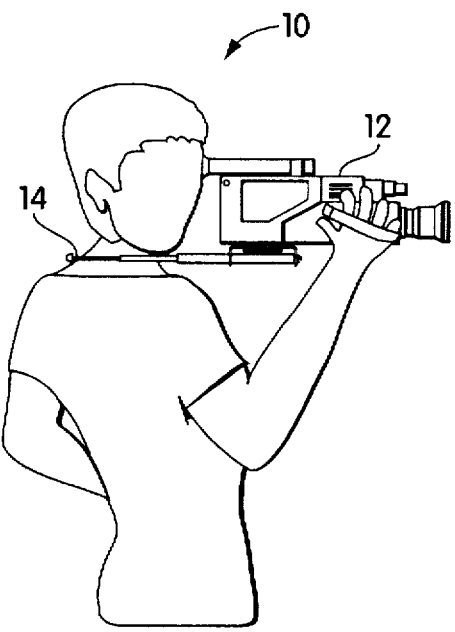
FIGS. 1 and 2 are a pictorial side view and top view, respectively, of an embodiment of the present invention.
Figure 2:
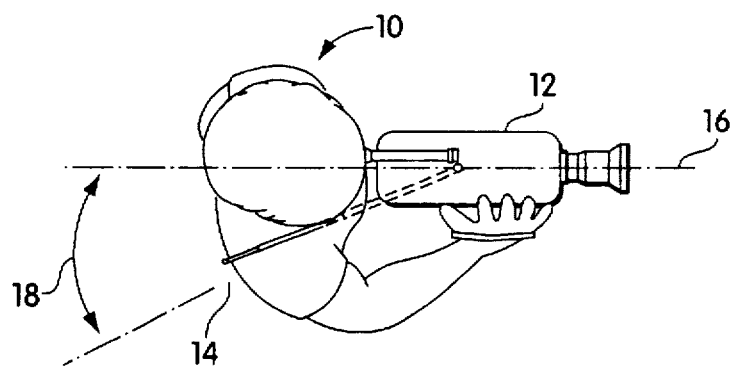

Referring to FIGS. 1 and 2, a user 10 holds a hand-held video camera 12 in front of his or her face to make a video film. A stabilizing mechanism 14 includes an elongated rod which is pivotally coupled to the bottom of camera 12, and extends at least to the user's shoulder and can rest against the upper torso, e.g., on the shoulder, against the face, or against the neck. Mechanism 14 extends at an angle 18 relative to the line of sight 16 (FIG. 2). The elongated rod of mechanism 14 may be positioned over the other shoulder or against the other side of the neck or face if that position would be more comfortable to the user.

Figure 3:
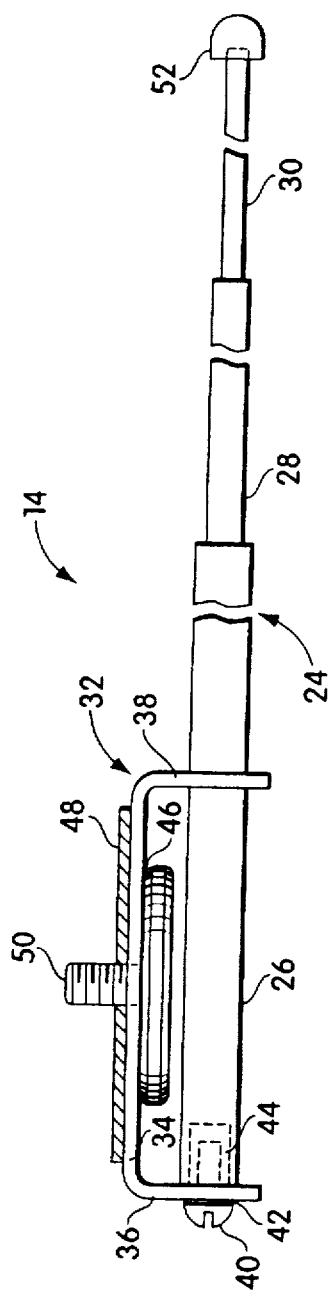
FIGS. 3 is a side view of a first embodiment of the present invention.

Referring to FIG. 3, the suspension mechanism 14 has a rod 24, which is preferably light-weight and has three telescoping sections 26, 28, and 30, in descending order of width. Mounted at the end of rod 24 with the widest portion 26 is a bracket 32 with a flat body portion 34, and first and second similarly flared sides 36, 38 which are parallel to each other and perpendicular to body 34. First flared portion 36 extends across the end of rod portion 26, has a screw hole which is smaller than the diameter of portion 26. Inserted into the end of portion 26 is a threaded brass machined and tapped support plug 44. Flared portion 36 is coupled to rod 24 by inserting a screw 40 through a washer 42, through the hole in flared portion 36, and into plug 44.

Second flared portion 38 has a circular opening a little larger than the diameter of rod portion 26 to allow rod portion 26 to pass through it. Body 34 of bracket 32 has a centrally located aperture which receives a screw 50 with a knurled ring 46. Ring 46 is positioned at the surface of body 34 which faces the rod portion 26. On the other side of the bracket, a rubber pad 48 with a hole similar to that in bracket 32 is positioned across most of the central section. Screw 50 is coupled to a tripod tap in the bottom of the camera (not shown). When coupled to the tripod top, the mechanism moves in a single plane which is horizontal from a user's perspective. At the other end of rod 24, a threaded domed plug 52 is screwed over the end of the narrowest portion 30 of telescoping rod 24.

In a representative embodiment, stabilizing mechanism 14 is about 6.5 inches by 2.0 inches in size, and weights about 4.0 ounces. Consequently, mechanism 14 is easily portable and light-weight.

In practice, stabilizing mechanism 14 helps to spread tremors from a user's body and hands to the upper torso of the user, and to move the center of gravity away from the attack angle of the camera lens. As a result, the jitter in the picture due to hand tremors is reduced, and the quality of the resulting film is improved.

Figure 4:
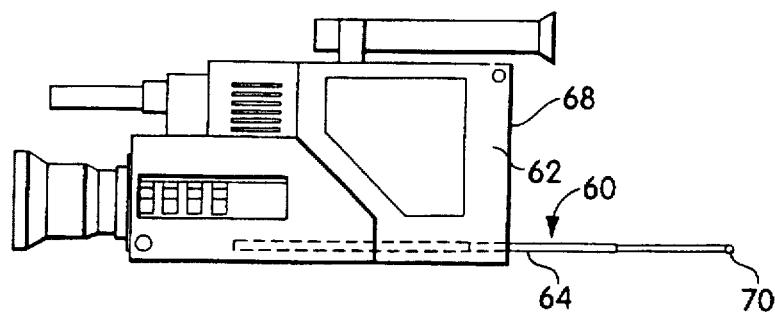
FIGS. 4–6 are a pictorial side view, bottom view, and end view of a camera with the stabilizing mechanism according to a second embodiment of the present invention.
Figure 5:
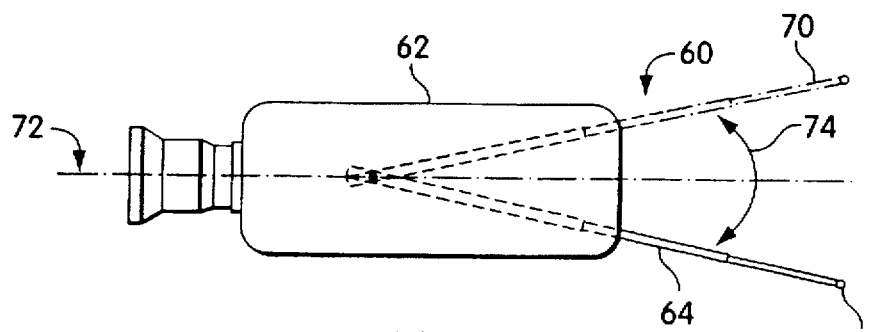
Figure 6:
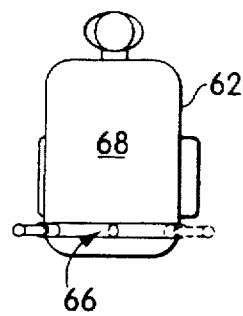

Referring to FIGS. 4–6, in a second embodiment of the present invention, a stabilizing mechanism 60 is built into a housing 62 of the camera. A rod, preferably a telescoping rod 64 similar to rod 24 (FIG. 3) enters camera housing 62 through a cavity 66 in a front end 68 of the camera and is pivotally connected within the housing. Cavity 66 is preferably elongated in a direction transverse to rod 64 so that the width of the cavity is much wider than the width of the rod. Rod 64 can be rotated along an angle 74 in a single plane which is horizontal from the user's perspective by an amount sufficient enough so that the rod can rest on either shoulder of the user. Rod 64, like rod 24 (FIG. 3), is preferably a telescoping, three-piece assembly with a plug 70 at the outer end.

Having thus described a number of preferred embodiments, it should become apparent to those skilled in the art that other modification may be made without departing from the scope of the invention as defined by the appended claims. For example, one could use a similar mechanism with binoculars or a telescope.

What is claimed is:

1. A stabilizing apparatus for a handheld optical system through which a user has a line of sight to objects in front of the system, the apparatus comprising:

A. a single telescoping rod having a first end and a second end and being oriented such that when a user looks through the system the second end of the rod extends toward the user at an angle to the line-of-sight, the rod being the only element of the apparatus that rests against the user; and B. means for mounting the first end of the rod on the optical system, the means for mounting including:

a. an inverted U-shaped bracket including a body having a hole through which a first screw extends, a first flared side having a hole through which a second screw extends and a second flared side having a hole through which the second end of the rod extends;

b. the first screw that extends through the hole in the body of the bracket and screws into a threaded aperture in the optical system; and c. the second screw that extends through the hole in the first flared leg of the U-shaped member and screws into the first end of the rod; and C. a threaded aperture at the first end of the rod to receive the second screw.

2. A stabilizing apparatus for a handheld camera having a threaded aperture, the apparatus comprising:

A. a single telescoping rod having a first end and a second end, the rod being oriented such that when a user looks through the camera the second end of the rod extends toward the user, the rod being the only element of the apparatus that rests against the user; and B. means for mounting the first end of the rod to the camera, the means for mounting including:

i. a first screw that screws into the threaded aperture in the camera ii. an inverted U-shaped bracket including a body having a hole through which the first screw extends, a first flared side having a hole through which a second screw extends and a second flared side having a hole through which the second end of the rod extends; and iii. the second screw that extends through the hole in the first flared leg of the U-shaped member and screws into the first end of the rod; and C. a threaded aperture at the first end of the rod to receive the second screw.

* * * * *